(12) United States Patent
Nagar et al.

(10) Patent No.: US 11,636,003 B2
(45) Date of Patent: Apr. 25, 2023

(54) TECHNOLOGY FOR LOGGING LEVELS AND TRANSACTION LOG FILES

(71) Applicant: International Business Machines Corporation, Armonk, NY (US)

(72) Inventors: Raghuveer Prasad Nagar, Kota (IN); Jagadesh Ramaswamy Hulugundi, Bangalore (IN); Abhishek Solanki, Lucknow (IN); Subba Rayudu Tangirala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 17/363,212

(22) Filed: Jun. 30, 2021

(65) Prior Publication Data
US 2023/0004460 A1    Jan. 5, 2023

(51) Int. Cl.
*G06F 11/00*    (2006.01)
*G06F 11/07*    (2006.01)
(Continued)

(52) U.S. Cl.
CPC ...... *G06F 11/0787* (2013.01); *G06F 11/0721* (2013.01); *G06F 21/552* (2013.01); *G06N 20/20* (2019.01); *G06F 2221/034* (2013.01)

(58) Field of Classification Search
CPC ............. G06F 11/0787; G06F 11/0721; G06F 11/076; G06F 11/06; G06F 11/3003; G06F 11/0706; G06F 11/0709
See application file for complete search history.

(56) References Cited

U.S. PATENT DOCUMENTS

| 8,527,458 B2 | 9/2013 | Park |
| 9,626,240 B2 | 4/2017 | Rajkovic |

(Continued)

FOREIGN PATENT DOCUMENTS

| EP | 669032 B1 * | 11/1997 | ............ G06Q 20/00 |
| KR | 101856543 B1 | 5/2018 | |

OTHER PUBLICATIONS

NIST Special Publication 800-145 The NIST Definition of Cloud Computing, Peter Mell, et al., Computer Security Division, Information Technology Laboratory, National Institute of Standards and Technology, Gaithersburg, MD 20899-8930, Sep. 2011, http://csrc.nist.gov/groups/SNS/cloud-computing/index.html.

*Primary Examiner* — Katherine Lin
(74) *Attorney, Agent, or Firm* — Anthony V. S. England; John Noh; Susan M. Maze

(57) ABSTRACT

Dynamic logging includes generating parsed event data by at least one natural language processor responsive to event data of a log for transactions of a target application. In response to the parsed event data, a first classifier classifies context states of the respective transactions of the target application. In response, a second classifier classifies trouble prone states of the respective transactions, wherein the trouble prone states are for respective hierarchical levels. When a logic module determines, for a current one of the trouble prone states for a current transaction, that the current trouble prone state is a higher trouble prone level than for a transaction immediately preceding the current transaction, the logic module sends an increased log detail selection to the target application, so that a greater amount of log detail is logged for at least a next transaction after the current transaction.

20 Claims, 6 Drawing Sheets

(51) Int. Cl.
    *G06F 21/55*    (2013.01)
    *G06N 20/20*    (2019.01)

(56) References Cited

U.S. PATENT DOCUMENTS

| | | |
|---|---|---|
| 2016/0330068 A1 | 11/2016 | Beisiegel et al. |
| 2017/0010934 A1 | 1/2017 | Liu et al. |
| 2019/0377819 A1 | 12/2019 | Filliben et al. |
| 2019/0379574 A1 | 12/2019 | Sun |
| 2020/0233857 A1 | 7/2020 | Fehling et al. |

* cited by examiner

TECHNOLOGY FOR LOGGING LEVELS AND TRANSACTION LOG FILES

BACKGROUND

Event logs are human readable, i.e., natural language, records of events occurring during program execution for providing a human readable audit trail, which personnel can read to diagnose problems, such as security intrusions, performance slowdowns, crashes and other anomalies. Such event logs may include identity references, user actions, data sets, logic executed and transaction type, category, sequence, date and time, etc.

Loggers that generate event logs are usually provided for database systems and web servers and are often provided in other programs, as well. A database management system ("DBMS") (also referred to as a "database system") includes software that interacts with a database, applications and users for performing transactions on the database, which includes transactions for storing data of the database. Database transactions also include those that merely analyze and generate reports about the data and others that change the stored data, of course. A web server includes software that provides web pages in response to requests from a user agent, such as a web browser, and that may also receive and store data from the user agent. In production environments handling millions of transactions in a day or even in an hour, event logs are voluminous. In an embodiment of the present invention, a computer system implemented method comprises receiving, by the computer system, course content for a course of study and performing a certain exam question generating procedure for the course content.

SUMMARY

In an embodiment of the present invention, a computer system implemented method of dynamic logging includes generating parsed event data by at least one natural language processor responsive to event data of a log for transactions of a target application. The method includes classifying, by a first classifier applying a first machine learning model to the parsed event data, context states of the respective transactions of the target application. A second classifier applying a second machine learning model to the parsed event data and the context states, classifies trouble prone states of the respective transactions, wherein the trouble prone states are for respective hierarchical levels. A logic module determines, for a current one of the trouble prone states for a current transaction, that the current trouble prone state is a higher trouble prone level than for a transaction immediately preceding the current transaction. The logic module sends to the target application, an increased log detail selection responsive to the determining that the current trouble prone state is the higher trouble prone level, so that a greater amount of log detail is logged for at least a next transaction after the current transaction.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
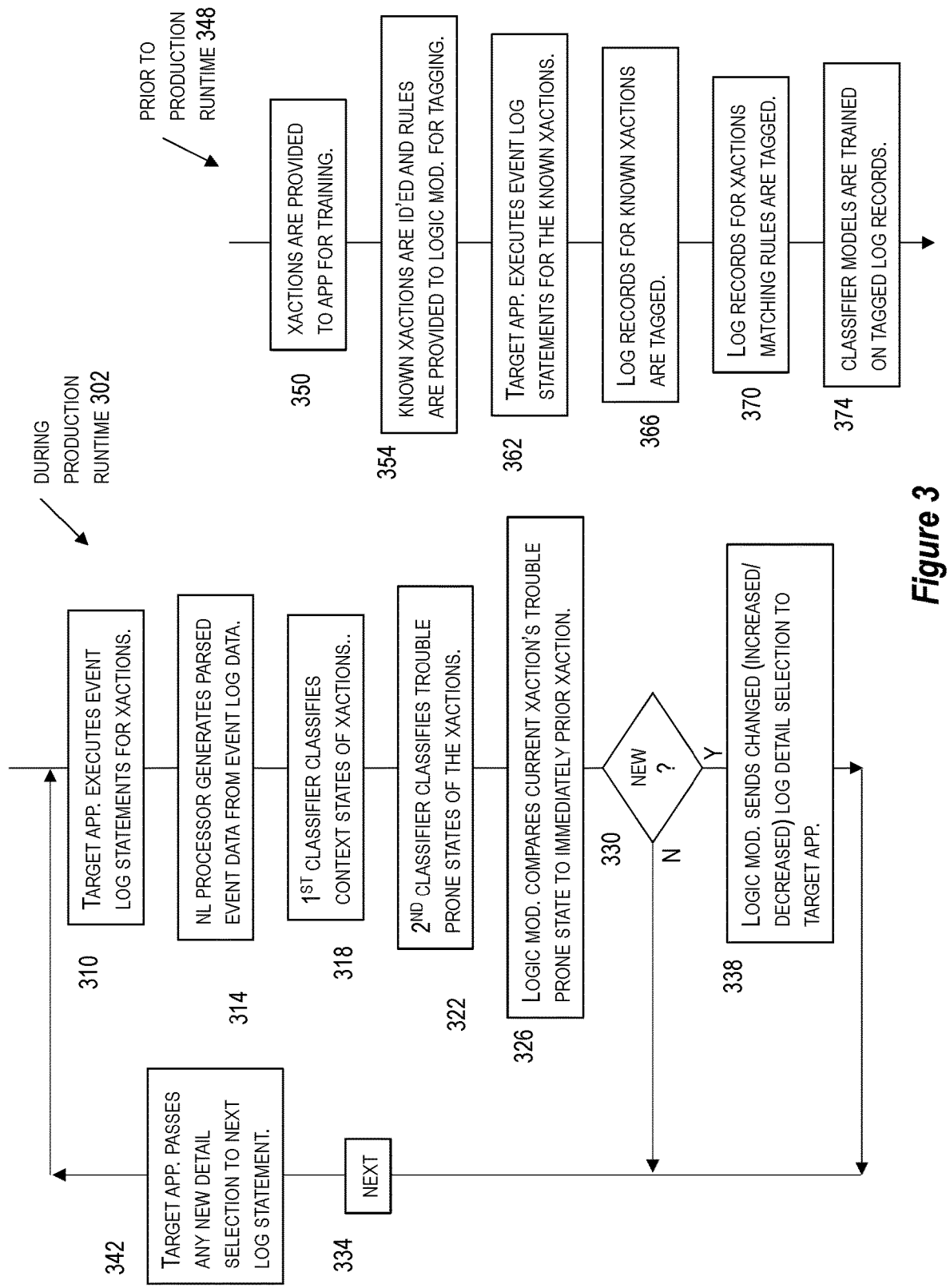
FIG. 3 is a flow chart illustrating certain actions performed prior to and during production runtime, according to at least one embodiment of the present invention.
Figure 4:
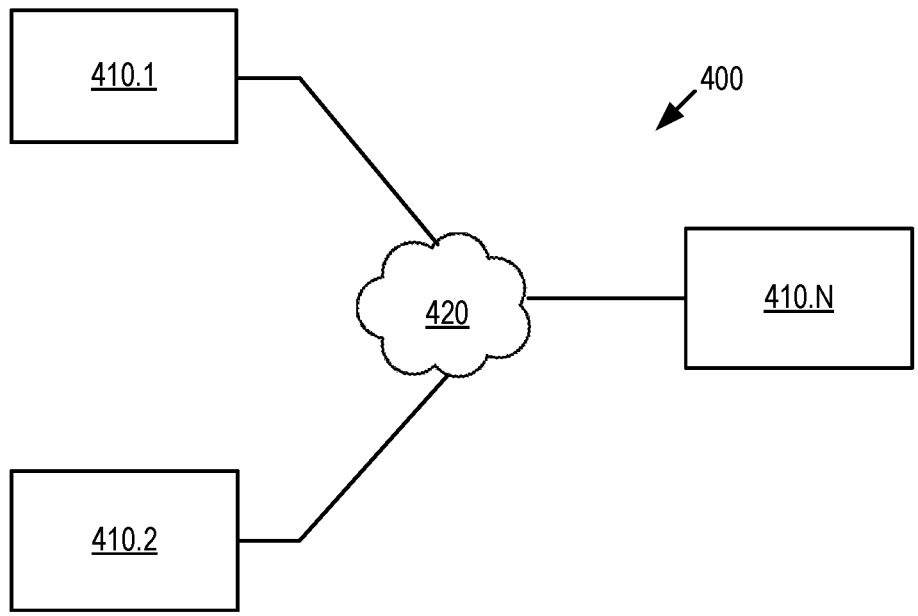
FIG. 4 illustrates a networked computer environment, according to at least one embodiment of the present invention.

FIG. 4 illustrates an example computing environment 400 suitable for embodiments of the present invention. As shown, computing environment 400 includes computer systems 410.1, 410.2 through 410.N connects via network 420, which may be a public or private network. Systems 410.1, 410.2, etc. include modules, which may be program or hardware modules, configured to perform tasks for their own respective systems or for other systems or both, including tasks as described for elements of FIGS. 1 through 3 herein.

Figure 5:
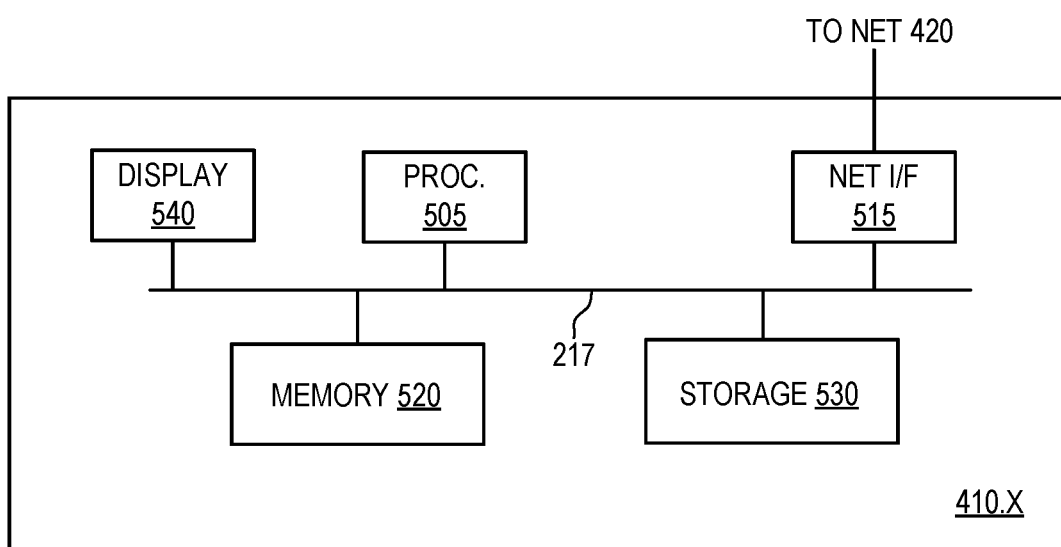
FIG. 5 is a block diagram of a computer system such as those shown in FIG. 4, according to at least one embodiment of the present invention.

FIG. 5 illustrates details of a computer system 410.X suitable as computer systems 410.1, 410.2, etc. according to embodiments of the present invention, wherein system 410.X includes at least one central processing unit (CPU) 505, network interface 515, interconnect (i.e., bus) 517, memory 520, storage device 530 and display 540. CPU 505 may retrieve and execute programming instructions stored in memory 520 for applications. Similarly, CPU 505 may retrieve and store application data residing in memory 520. Interconnect 517 may facilitate transmission, such as of programming instructions and application data, among CPU 505, storage 530, network interface 515, and memory 520. CPU 505 is representative of a single CPU, multiple CPUs, a single CPU having multiple processing cores, and the like. Additionally, memory 520 is representative of a random-access memory, which includes data and program modules for run-time execution. It should be understood that system 410.X may be implemented by other hardware and that one or more modules thereof may be firmware.

Figure 1:
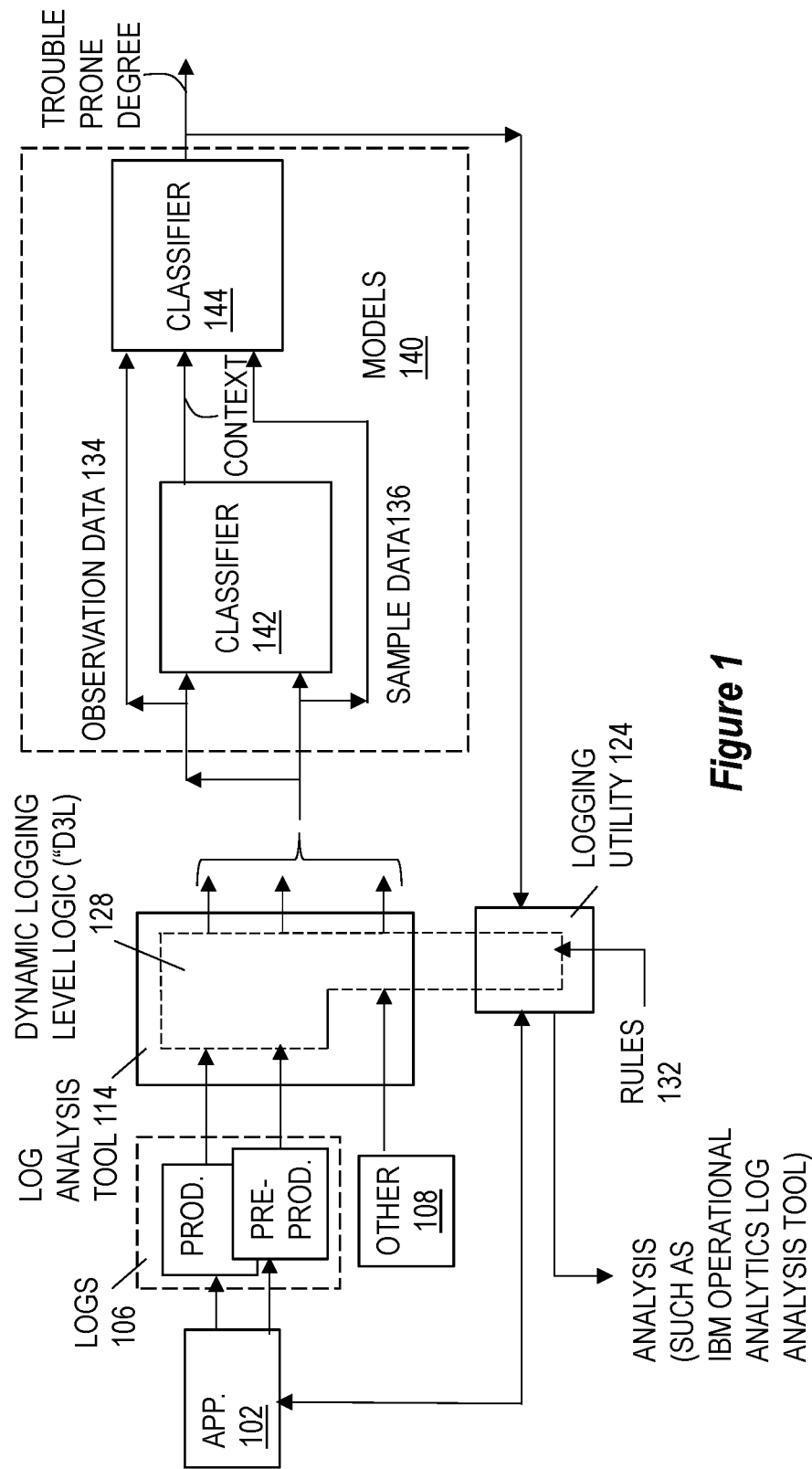
FIG. 1 illustrates an arrangement for event logging, according to at least one embodiment of the present invention.

Referring to FIG. 1, according to an embodiment of the present invention, a logger 104 may operate in conjunction with an event logging utility 124 that allows a user to configure various logging levels. For example, logging utility 124 may be provided by a software program implemented from an open source framework such as "Logback" or "Apache Log4j," for example. The event log 106 arises from log statements defining what to write to a log 106, where the statements are user programmed in source code of a target application 102, such as a DBMS. The statements get triggered by events encountered at run time, i.e., during a time when application 102 is executing transactions. Each log statement also defines a respective log level to which it applies, or is otherwise associated with the log level, such that if a log statement in application 102 is for high level logging but is encountered when application 102 is running with a current logging level that is lower, the log statement does not case a log record to be written. That is, the log statement will cause application 102 to write a log 106 record only if the log statement is encountered while the current logging level is at least as high as the logging level of the log statement.

A logger may also provide a different kind of log that relates more specifically to transactions. As the term is used herein, a "transaction" concerns a change in data that must be performed completely, in which case the change is committed, or else not performed at all, in which case a change that has started is rolled back to eliminate the effect of the change. Transaction logs are for maintaining the data in a coherent state, which includes automatic recovery from crashes and other data errors. Accordingly, transaction logs are machine readable. Event logs may include transaction identities and other transaction attributes, such as initiation and completion of transactions. However, event logs differ from transaction logs in that event logs are for more general problems, such as determining the cause of crashes, hang ups and poor performance, rather than merely the problem of maintaining data coherency. Also, event logs are human readable, so that personnel can read to the event logs to diagnose the more general problems.

Embodiments of the present invention involve a recognition that in high throughput data processing environments, data administrators (or other users with requisite authority) often set event logging at reduced levels to avoid adversely impacting performance. That is, an administrator may have a logging utility 124 set to a reduced logging mode, such as INFO or ERROR mode, rather than a more detailed logging mode, such as DEBUG or VERBOSE mode that provides more details in log 106 records, which tends to be more helpful for troubleshooting when a problem arises. Examples of log 106 records are shown in Appendix AA for respective levels of logging detail, according to an embodiment of the present invention.

Disclosed herein is newly provided logic 128 ("dynamic logging level logic" or "D3L") that employs natural language processing ("NLP") and interfaces to machine learning (e.g., models 140) to automatically and dynamically increase or decrease a logging level during production runtime for an application 102, such as a database system or web server, for example. (Bagging may be used for training data and multiple, ensembled models 140 may be created to decrease variance and improve accuracy in prediction.)

The increasing or decreasing of logging level is based on real time analysis during application 102 run time of transaction attributes, context and history from production logs 106 and other sources 108, which are applied as observation data 134 to trained models 140 running in an operating mode. Based on data 134 for a transaction, first classifier 142 of models 140 classifies the transaction according to its context state. Second classifier 142 of models 140 receives the context state from classifier 142 and also receives data 134. Based on these, classifier 142 classifies the transaction according to its trouble prone degree. Alternatively, rather than first classifying context and then classifying degree of trouble prone, a single model may classify context and degree of trouble prone in a single classification.

Before models 140 run in the operating mode to classify transactions, they must be generated, i.e., configured and trained. During model 140 generation, D3L 128 causes configuration of machine learning models 140, e.g., classifiers 142 and 144. (The models 140 may be of the support vector machine type or k-nearest neighbor type, for example, which may be implemented by the Watson Studio Natural Language Classifier commercially available from International Business Machines Corporation, for example.) In one alternative, generating models 140 includes D3L 128 configuring and initiating training for at least first classifier 142 to identify contexts for transactions and at least second classifier 144 to further identify states for the transactions according to their identified contexts. Transaction contexts that at least first classifier 142 identifies may include functional, technical and security related states, for example. In one alternative, transaction states that at least second classifier 144 identifies concern likelihood of trouble and may be labeled HOT, WARM, COLD states, for example, wherein transactions in the HOT state are the most trouble prone transactions, transactions in the WARM state are moderately trouble prone and transactions in the COLD state are least trouble prone. The labels may vary in different alternatives. For example, the labels may indicate trouble prone likelihood as HIGH, MEDIUM and LOW.

The following are pseudo code examples of statements for execution of transactions:

Examples for COLD transactions
      Validate customer
      Check customer return order line item and reason code
      Call center processing refund as regular return as it is within the return window of 30 days and originating from an authentic customer
    Examples for WARM transactions
      Validate customer
      Check customer return order line item and reason code.
      Call center processing refund as non-regular as it is outside the return window of 30 days and originating from an authentic customer
    Examples for HOT transactions
      Validate customer
      Check customer return order line item and reason code
      Call center processing refund as non-regular as it is outside the return window of 30 days and originating from a fraudulent customer Non-production log 106 data and data from other sources 108 may be used for training models 140 in one supervised learning alternative. Such non-production log 106 data is generated by application 102 processing known transactions in a non-production environment, such as during functional testing or security testing. Some trouble prone transactions may be configured by an administrator before testing is begun to intentionally cause trouble prone performance. For example, the administrator may configure trouble prone transactions that will perform override actions, amend service delivery, perform repeatedly by a single requester, etc. Other trouble prone test transactions for use in application 102 testing and subsequent training of models 140 may be identified after testing by the administrator from log 106 data compiled during testing. To render data more suitable for training, raw log 106 data from the non-production environment (e.g., SIT, QA, Perf, Pre-prod) is parsed by a known log analysis tool 114, such as Splunk or Logstash, for example. By parsing, condensing and filtering with such a log analysis tool 114, an administrator can analyze event log 106 data to gain detailed understanding for specific test transactions executed for particular workloads, such that the administrator can derive feature-related rules 132 for classifying the transactions, where the trouble prone transactions may include outlier parameters and transactions for which processing exceeds predefined limits, for example. That is, the administrator may define rules 132 relating to degree or likelihood of trouble prone performance such as described herein, for example, and after testing execution identify transactions having parameters and parameter values that match rules 132.

The following are examples of some output from NL processing of the logs, where the output provides parsed data that classifiers 142 and 144 receive:
NLP format example with word tokenization for INFO log:
['Order Number', 'SOS7090204']
NLP format example with sentence tokenization for VERBOSE log:
['Calling getCommonCodeList API to read rules from YFS_COMMON_CODE database table']
NLP format example with sentence and word tokenization for ERROR log:
['Error occurred in a transaction while testing a service due to file not available in expected location', '<location of file expected on the directory folder>']

Summarizing and expanding on the foregoing, context state and trouble prone degree are known for at least some of the trouble prone transactions included among the test transactions, because prior to testing application 102 an administrator intentionally configured some transactions to be trouble prone during test execution. Additional trouble prone transactions (and their context state and trouble prone degree) are automatically identified by D3L 128 after testing application 102 by comparing parameters and parameter values of those transactions to parameters and parameter values of predetermined rules 132 that the administrator provides to D3L 128 for defining trouble prone transactions and contexts. For the comparing to rules 132, D3L 128 obtains the parameters and parameter values of transactions from the testing logs 106 via the parsing by tool 114. D3L 128 may, if needed, further process the parsed data it receives from tool 114. That is, if log analysis tool 114 does not perform sufficient condensing and filtering to eliminate unwanted lines, comments or statements from logs 106 and if log analysis tool 114 does not apply NL processing techniques to obtain clearly defined parameters and parameter values of transactions from the testing logs 106 for tagging the data with the parameters and parameter values for the transactions, then D3L may perform these functions to the extent they are not done by log analysis tool 114. In one alternative, D3L 128 employs a known NLP tool and known processing methods for this further processing. Rules 132 are likewise defined by parameters and values. In general, parameters and values may concern reason codes, ATP calls, IP addresses, risk (e.g., credit) scores, etc., as described herein, for example.

The above described parameterizing of log 106 data and matching to rules 132 enables D3L 128 to also tag the derived data for each respective transaction with context and trouble prone state tags that enable model training, for example, tags <F, S or T> for the first model(s) 142 and <F/C, F/W, F/H, S/C, S/W, S/H, T/C, T/W or T/H> for the second model(s) 144. D3L 128 provides the data tagged with context and trouble prone states as sample data 136 for training. For training first classifier 142, tags for context state are applied automatically based on specific rules such as the following, for example:
Functional Context: Log indicates rules were overridden to provide an additional order; Log indicates backorder count was increased from a certain fulfillment location.
Technical Context: Error code or log indicate connection refused, Error code or log indicate out of memory space; Error code or log indicate certain API timed out after predetermined amount of elapsed time.
Security Context: Log indicates order on hold due to fraud detection; Log indicates recurring order with large line items at high frequency using same credit card.

For training second classifier 144, tags for trouble prone state are applied automatically based on specific rules such as the following, for example:
Transaction API response time>200 milli seconds is a performance issue and yields <Technical/Hot> tags; >100 and <=200 milli seconds yields <Technical/Warm> tags; <='100 milli seconds' yields <Technical/Cold> tags;
Override %>10% yields <Functional/Hot> tags; >='5% and <=10%' yields <Functional/Warm> tags; <'5%' yields <Functional/Cold> tags;
Risk Score<='400' is a resolution risk and yields <Security/Hot> tags; >400 and <=800 yields <Security/Warm> tags; >800 yields a <Security/Cold> tags.

During application 102 production run time after model 140 training, models 140 in an operating mode are provided observation data 134 that is not already tagged with context and trouble prone states. In the operating mode, models 140 classify transaction states for application 102 in real time from observation data 134 that is obtained in the same way as in testing, but from production logs 106 instead of non-production logs 106. That is, for the operating mode of models 140, D3L 128 still obtains the parameters and parameter values of transactions via the parsing by tool 114 and further processes the parsed data it receives to tag the received data with the parameters and parameter values for the transaction observation data 134 that D3L 128 provides to models 140. However, in one alternative for generating data 134, D3L 128 does not compare data received from tool 114 to rules 132 and, accordingly, does not tag data 134 with context and trouble prone states.

Models 140 classify context and trouble prone states of transactions in the tagged parameters and parameter values of data 134, where the models 140 perform the classifying based on 140 detecting patterns in the parameters and parameter values that the models 140 learned through training are associated with the states. Further, models 140 in operating mode continuously learn new rules 132 via contextual derivation over time, which adds more data features and dynamically changes tag boundary values. That is, real time observation data 134 from log 106 records tend to sometimes have the same, predefined parameters and values, e.g., Transaction API response time>200 milli seconds as in sample data 136, for example, and sometimes have parameters and values that are not the same as what is predefined in sample data 136, and sometimes even have some entirely different parameters and values than the ones that the predefined rules 132 indicate for the predefined states. Models 140 can recognize that some real time record(s), although not necessarily having parameter values exactly matching those in any of the predefined rules 132 (or even having parameters not exactly matching), nevertheless correspond(s) to one of the predefined states. Models 140 recognize this correspondence during training through automatically detecting a pattern wherein parameters and values of sample data 136, while not exactly matching parameters and values of predefined rules 132, are nevertheless associated with, e.g., correlated with, parameters and values of sample data 136. In this detecting of patterns, models 140 identify parameters and values that define new "rules," so to speak.

When the classifying by trained models 140 determines that state for an observed transaction changes from COLD to WARM (or, alternatively, from COLD or WARM to HOT) in the context of the transaction's execution, models 140 responsively notify logging utility 124 to trigger an increase in logging detail, i.e., logging level. Models 140 notify utility 124 to trigger a decrease in logging detail when status for an observed transaction changes to less trouble prone.

Logging utility 124 may be modified, according to an embodiment of the present invention, to trigger generation of additional log 106 files in addition to increasing detail of log 106 content when increasing a log level. For example, utility 124 may cause a separate log 106 file to be generated for each transaction identified as sufficiently trouble prone. According to a predetermined threshold, a transaction must be HOT to be sufficiently trouble prone cause a separate log 106 file in one alternative, whereas WARM may be predetermined as sufficiently trouble prone in another alternative. Further, utility 124 may be modified to vary its response to trouble prone state change depending also on a transaction's contextual state, e.g., functional, technical, security, etc.

Further, upon detecting a status change to a more trouble prone state, the modified logging utility 124 may automatically initiate a support ticket for investigation by IT personnel and may trigger a more direct alert of IT and business personnel responsive to transactions turning HOT, such as by email to a predetermined address.

In another aspect, when transactions have turned WARM (or, alternatively, HOT), modified utility 124 may automatically initiate analysis of the more detailed log 106 files generated by a machine-based analysis tool to identify a root cause, such as an infinite loop in program code causing a memory leak, in an example instance, and to propose solutions. (For example, the analysis tool may include the Operations Analytics—Log Analysis tool commercially available from International Business Machines Corporation.) Upon the analysis tool identifying a cause, modified utility 124 may determine a solution and update a support ticket with a description of the analysis, predicted cause and predicted solution. This can allow a support team to not only more quickly replicate the issue in a lower environment but also quickly verify that the recommended fix is correct.

D3L 128 provides any or all of the following as training data 136 for the first, contextual state model(s), to enable dynamically determining context for specific transactions:
  Data indicating a functional context for a trouble prone transaction, which concern matters including transaction behavior and related actions violating predefined rules:
    Defined interface constraints that are correct in data structures but breached in terms of data
    Mismatches at transaction completion compared to transaction initiation
    Performance of override actions
    Reason codes, such as used for service delivery amendments, appeasements, etc.
    Error codes and error descriptions from stack trace
  Data indicating a technical context for a trouble prone transaction, which concern matters including and specification, including service-defined non-functional requirements for transactions:
    Performance of synchronous calls such as ATP (Available to Promise), reservation from front end channels on normal and peak processing times
    Throughput of batch jobs that do bulk shifting of transactions for lengthy times (i.e., times exceeding defined thresholds)
    Actions resulting in lengthy transaction boundary as of one of case
    Extended database connections, queue connections, hung threads causing system bottlenecks
  Data indicating a security context for a trouble prone transaction, which concern matters including transaction, activities and profile policies and compliance needs:
    Unusual IP address accessing an application
    Abnormal request by unknown/guest users, e.g., large number of requested units with large number of lines
    Resolution risk
    Repeated transactions performed by single requester such as repeating due to slow performance or non-performance, repeating due to changed resolution means, etc.

In addition to obtaining data 134 and 136 from logs 106, data 134 and 136 may be obtained from other sources 108 in the form of structured database reports, semi-structured files or unstructured raw data that may be parsed for content by known tools. Reason codes, notes, instructions used on documents by personnel are available through an audits engine. Transactions breaching service thresholds and tolerances and hardware sizing constraints are available to through health monitors. Memory, CPU and RAM memory-heap utilization are available through tools on the operating system of application 102's platform. Long running queries (database jobs) or regular batch jobs are available for models 140 through a combination of process profiles generated at the operating system level. Concurrent users at any given time is available through a count of user active connections to application 102. Historical behavior of application 102 with regard to a specific transaction is available via the pre-production logs 106 for the encompassing incidents and their respective actions (one or multiple or a combination of actions). History associated with enforced jeopardy management policies is likewise available. This encompasses what jeopardy incidents occurred and what was their treatment in line with policies. In one such example, the archival and backup was not being done real-time in the enterprise. Historical records indicate how this policy violation impacted a Recovery Time Objective (RTO) and Recovery Point Objective (RPO) metrics in the context and what was achieved later to have RPO and RTO well controlled.

Figure 2:
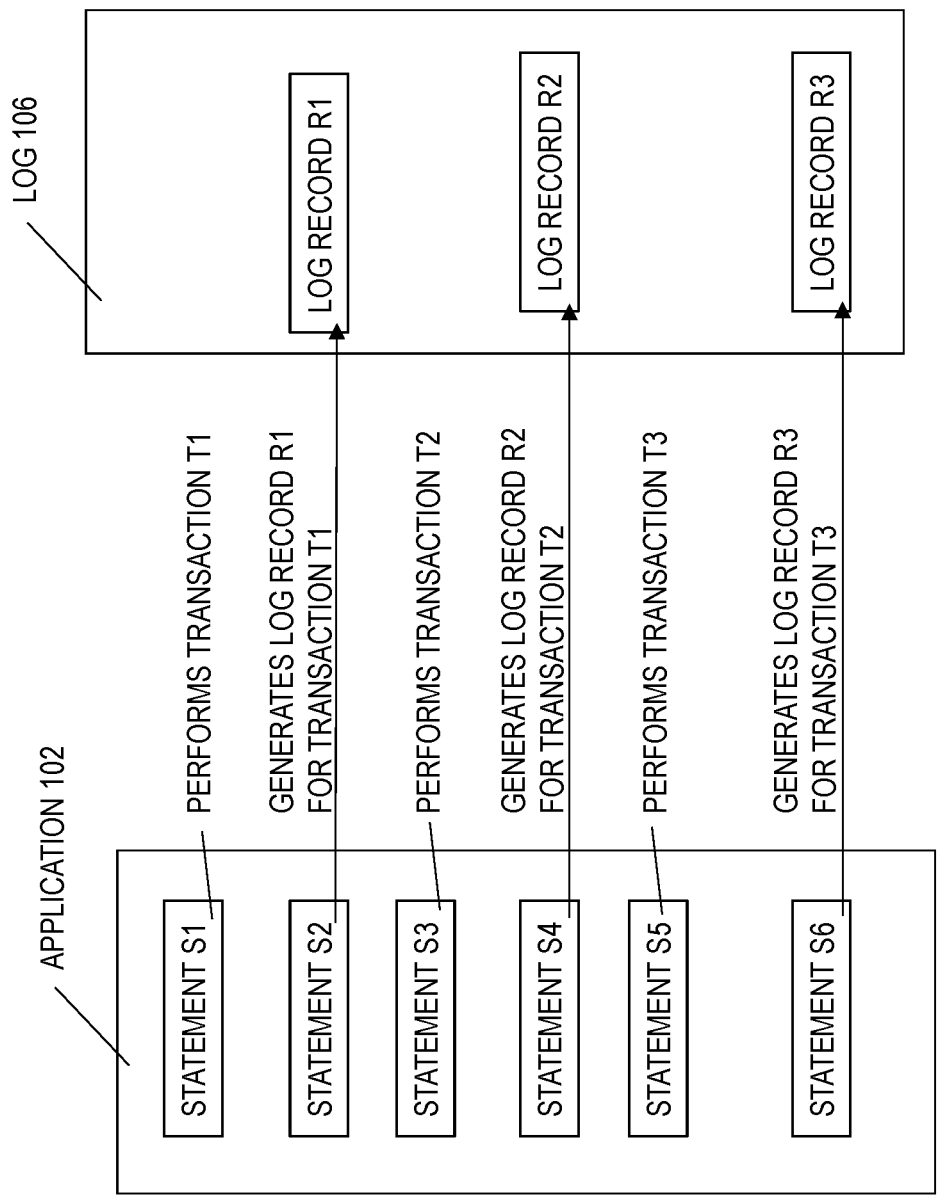
FIG. 2 depicts instructions in source code of a target application, according to at least one embodiment of the present invention.

Referring now to FIG. 2 together with FIG. 1, according to an embodiment of the present invention, instructions (also known as, or included in, "statements") S1, S2, S3, etc. are shown in source code of target application 102. Application 102 executes instructions S1, S2, S3, etc. in sequence S1, S2, S3, etc. Statement S1 is an instruction to perform transaction T1. Statement S2 is an instruction to generate a log record R1 for transaction T1. Statement S3 is an instruction to perform transaction T2. Statement S4 is an instruction to generate a log record R2 for transaction T2. Likewise, statements S5 and S6 are for transactions T3 and log record R3. (Many more statements are included, but not shown. Note that statements S1 and S2 may be a single statement with instructions for both performing transaction T1 and for generating log record R1. Likewise, statements S3 and S4 may be a single statement for T2 and R2, etc.)

At the time when transaction T1 is executed responsive to S1, the trouble prone state for application 102 (and transaction T1) is Low (or Cold). Then log record R1 for T1 is generated responsive to statement S2, where the logging detail for R1 is, correspondingly, low (e.g., Info level of detail). Then classifiers 142 and 144 analyze R1 and classifier 144 responsively changes the trouble prone state to Medium (or Warm). Then transaction T2 is executed responsive to statement S3. Then log record R2 for T2 is generated responsive to S4, where the logging detail for R2 is now Medium (e.g., Error).

From all of the foregoing, it should be understood that technology is disclosed for a computer system implemented method, system and program product for dynamic logging including actions and structures set out herein. Specifically, as illustrated in flow chart fashion in FIG. 3 according to an embodiment of the present invention, at least the following actions are performed 302 during production runtime of a target application based on event data in a NL log that is logged during the production runtime responsive to the target application executing event log statements for respective transactions. (In the logging, respective amounts of detail are logged responsive to respective log detail selections received by the target application and passed by the target application to the event log statements.)

In one aspect, the actions performed during the production runtime 302 include the target application executing 310 an event log statement for a transaction and generating 314 parsed event data for a transaction by at least one NL processor responsive to the event data of the log. A first classifier, by applying a first machine learning model to the parsed event data, classifies 318 a context state of the transaction of the target application. A second classifier, by applying a second machine learning model to the parsed event data and the context states, classifies 322 a trouble prone state of the transaction, which is one state of respective states that have hierarchical levels. A logic module compares 326 the trouble prone state for the current transaction to that of a transaction immediately preceding the current transaction. In response, the logic module determines 330 whether the current trouble prone state is a new trouble prone level, i.e., higher or lower than for the transaction immediately preceding the current transaction. If no, the logic module does not send ("no" branch) a change in log detail selection to the application, so that for a next 334 transaction, the application continues logging with the same level of log detail in the same log file and does not generate a new log file.

If the logic module determines 330 that the trouble prone state is new ("yes" branch), the logic module does send 338 a change in log detail selection to the application. For any such new log detail selection, the application passes 342 the new selection to a log statement for the next transaction 334 and subsequent transactions until such time as the logic module again changes the log detail selection. The selection sent 338 is a decreased log detail selection responsive to an instance of determining 330 that the current trouble prone state is a lower trouble prone level, so that a lesser amount of log detail is logged for at least the next transaction after the current transaction, i.e., for the next transaction and immediately succeeding ones at the same trouble prone level. Conversely, the selection sent 338 is an increased log detail selection responsive to an instance of determining 330 that the current trouble prone state is a higher trouble prone level, so that a greater amount of log detail is logged for at least the next transaction after the current transaction, i.e., for the next transaction and immediately succeeding ones at the same trouble prone level.

In one alternative, when increased log detail selection applies, the logic module may also send a selection to the target application directing the target application to generate a separate log file for the next transaction and subsequent transactions of the same, higher detail level. The separate file may be either instead of or else in addition to the log file to which records are currently being written. The logic module may be configured to also apply other criteria for generating separate log files. For example, it may only generate separate log files when the trouble prone state is the highest level.

Still further, it should be understood that generating 314 the parsed event data by the at least one NL processor may include generating the parsed event data by an NL processor of the logic module. Also, the first and second machine learning models applied for the first and second classifiers at 318 and 322, respectively, may include respective clustering models.

Also from the foregoing, it should be understood that the context states of respective transactions of the target application may include, in an embodiment, a security context for one of the transactions, for example, a technical context for one of the transactions, for example, and a functional context for one of the transactions, for example. The hierarchical levels may include at least a lowest level, a highest level and a level between the lowest and highest levels.

As further illustrated in flow chart fashion in FIG. 3, according to an embodiment of the present invention, at least the following actions are performed 348 prior to production runtime of the target application. Sample instructions for transactions are provided 350 by a user to the target application for training, including for transactions that are known to be for a certain context state and known to have a certain trouble prone level (i.e., trouble prone state). The user also identifies 354 for the logic module the associations of the known states (context and trouble prone states) and respective sample instructions. Also at 354, the user provides rules to the logic module for identifying context and trouble prone states. That is, transactions that match certain ones of the rules are also trouble prone and of a certain context, as has been described in examples herein. The user may also provide sample transaction instructions for training that match ones of the rules but that the user does not otherwise identify to the logic module for tagging.

Once the user has compiled or otherwise provided the application with source code for the sample transactions and their corresponding event log statements, the application executes 362 all the transaction statements and their log statements, which generates event logs. The event logs are parsed by NL processing, as described previously herein above. The logic module adds context and trouble prone tags 366 to the parsed event data for applicable transactions based on the known, user identified transactions. Also, due to parsed event data for the transactions matching ones of the rules, the logic module tags 370 any applicable transactions according to their context and trouble prone states, even though the transactions are not otherwise identified by the user for tagging. The classifiers are then trained 374 on the tagged, parsed event data, so that the classifiers will recognize context and trouble prone states for untagged, parsed event data for transactions during production runtime.

It should be appreciated that patterns for classifying log 106 data may differ from feature to feature and based on implementation, which are unique to every workload. Machine learning needs more and more data to be accurate in detection. Embodiments of the present invention involve a recognition that every implementation has unique customization, service rules, nonfunctional requirement needs and security policies. The disclosed technology relies upon logs 106 to validate the correctness of solutions before use in actual service. In so doing, the context of implementation is factored in for classifying the log 106 data. Since log 106 data generated in non-production environments are varied, large and diverse, such data is very useful for training the machine learning models 140.

The following provides a detailed description of aspects concerning a cloud computing embodiment of the present invention. It is to be understood that although this disclosure includes this detailed description regarding cloud computing, implementation of the teachings recited throughout this application are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portility (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
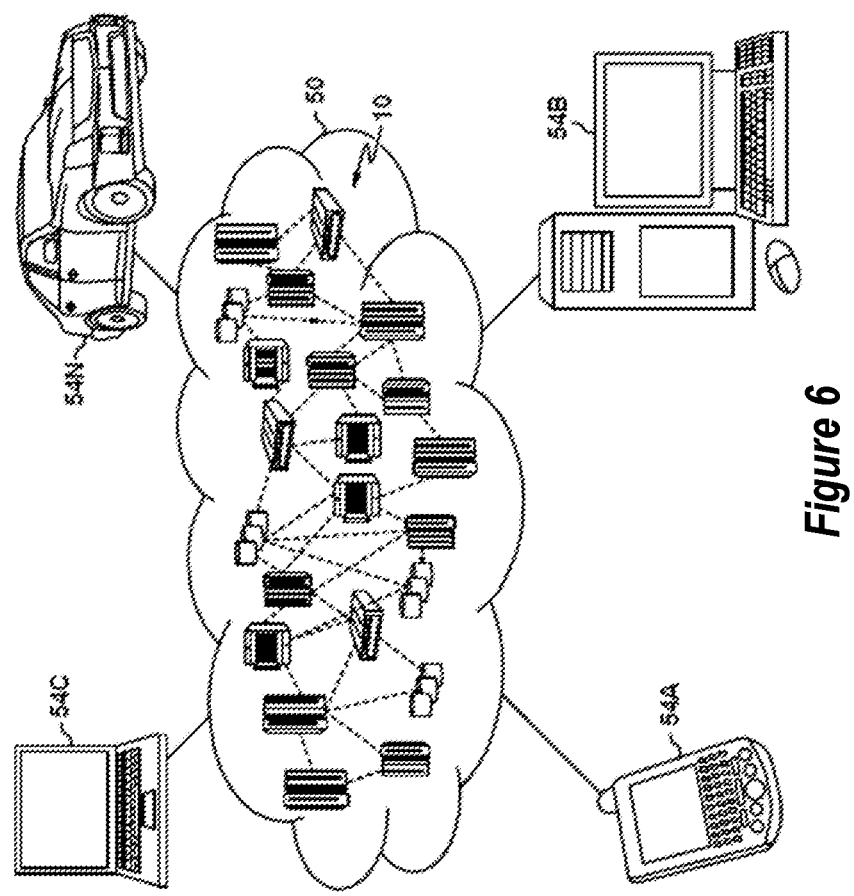
FIG. 6 depicts a cloud computing environment, according to at least one embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
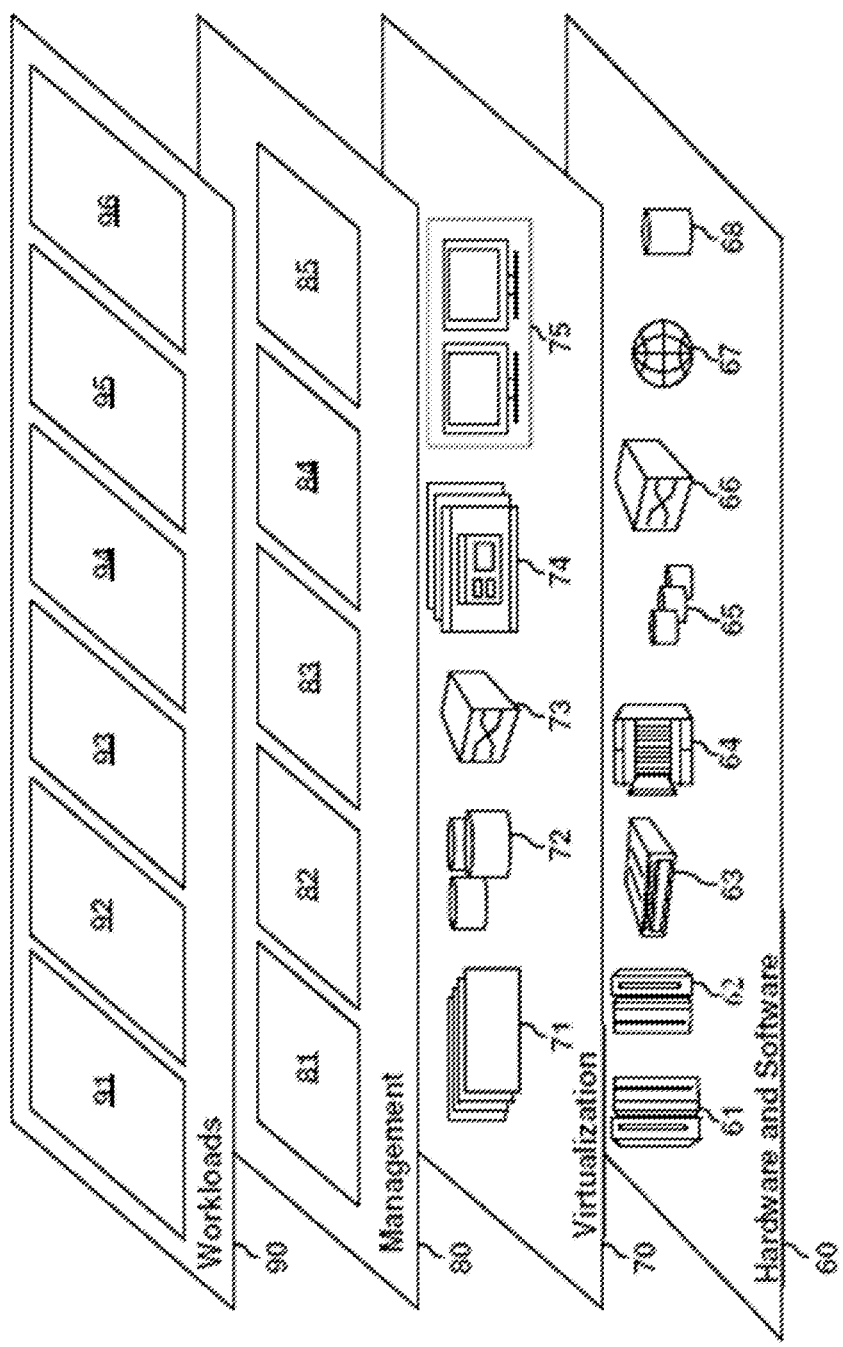
FIG. 7 depicts abstraction model layers, according to at least one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and logging 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Reference herein to a "procedure" is not necessarily intended to indicate implementation of invention embodiments in a procedural language.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Also, although features can be described above as acting in certain combinations and even initially claimed as such, features from a claimed combination can in some cases be excised from the combination, and the claimed combination directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

APPENDIX AA

INFO log

INFO:Releasing Order Number SOS7090204

INFO:Releasing Order Number CGS7111207

INFO:Releasing Order Number NRS7087968

INFO:Releasing Order Number WES7036774

INFO:Releasing Order Number RIS7112829

INFO:Releasing Order Number CGS7111220

Releasing order : CGS7111207 #Release B4: 0!!! Release Failed !!! * #Release Af: 0

INFO:Releasing Order Number BNS7210089

Releasing order : SOS7090204 #Release B4: 0!!! Release Failed !!! * #Release Af: 0

INFO:Releasing Order Number ESS7235400

Releasing order : RIS7112829 #Release B4: 0!!! Release Failed !!! * #Release Af: 0

INFO:Releasing Order Number CYS7033102

INFO:Releasing Order Number ENS7025402

Releasing order : CGS7111220 #Release B4: 0!!! Release Failed !!! * #Release Af: 0

Releasing order : WES7036774 #Release B4: 0!!! Release Success !!! #Release Af: 1

INFO:Releasing Order Number SOS7090253

INFO:Releasing Order Number JAS7019905

Releasing order : NRS7087968 #Release B4: 0!!! Release Success !!! #Release Af: 1

Releasing order : CYS7033102 #Release B4: 0!!! Release Failed !!! * #Release Af: 0

INFO:Releasing Order Number EAS7183356

INFO:Releasing Order Number BTS7032810

Releasing order : ENS7025402 #Release B4: 0!!! Release Failed !!! * #Release Af: 0

INFO:Releasing Order Number NMS7030822

Releasing order : ESS7235400 #Release B4: 0!!! Release Failed !!! * #Release Af: 0

INFO:Releasing Order Number HHS7028953

Releasing order : BNS7210089 #Release B4: 0!!! Release Failed !!! * #Release Af: 0

Releasing order : SOS7090253 #Release B4: 0!!! Release Failed !!! * #Release Af: 0

INFO:Releasing Order Number BNS7210120

Releasing order : JAS7019905 #Release B4: 0!!! Release Failed !!! * #Release Af: 0

INFO:Releasing Order Number EAS7183378

Releasing order : BTS7032810 #Release B4: 0!!! Release Failed !!! * #Release Af: 0

INFO:Releasing Order Number ENS7025418

INFO:Releasing Order Number MLS7049517

Releasing order : HHS7028953 #Release B4: 0!!! Release Failed !!! * #Release Af: 0

Releasing order : EAS7183356 #Release B4: 0!!! Release Failed !!! * #Release Af: 0

INFO:Releasing Order Number NUS7081035

Releasing order : NMS7030822 #Release B4: 0!!! Release Failed !!! * #Release Af: 0

INFO:Releasing Order Number ADS7105853

INFO:Releasing Order Number OAS7122102

Releasing order : EAS7183378 #Release B4: 0!!! Release Failed !!! * #Release Af: 0

INFO:Releasing Order Number SOS7090288

Releasing order : BNS7210120 #Release B4: 0!!! Release Failed !!! * #Release Af: 0

INFO:Releasing Order Number OAS7122103

Releasing order : MLS7049517 #Release B4: 0!!! Release Failed !!! * #Release Af: 0

Releasing order : NUS7081035 #Release B4: 1!!! Release Failed !!! * #Release Af: 1

INFO:Releasing Order Number AMS7182292

Releasing order : ADS7105853 #Release B4: 0!!! Release Failed !!! * #Release Af: 0

INFO:Releasing Order Number MNS7039387

INFO:Releasing Order Number BNS7210131

Releasing order : ENS7025418 #Release B4: 1!!! Release Failed !!! * #Release Af: 1

Releasing order : OAS7122102 #Release B4: 0!!! Release Failed !!! * #Release Af: 0

INFO:Releasing Order Number HHS7028972

Releasing order : SOS7090288 #Release B4: 0!!! Release Failed !!! * #Release Af: 0

INFO:Releasing Order Number SYS7037963

INFO:Releasing Order Number KOS7094539

Releasing order : AMS7182292 #Release B4: 0!!! Release Failed !!! * #Release Af: 0

Releasing order : MNS7039387 #Release B4: 0!!! Release Failed !!! * #Release Af: 0

INFO:Releasing Order Number JAS7019919

INFO:Releasing Order Number CYS7033133

Releasing order : OAS7122103 #Release B4: 0!!! Release Failed !!! * #Release Af: 0

Releasing order : BNS7210131 #Release B4: 0!!! Release Failed !!! * #Release Af: 0

INFO:Releasing Order Number ADS7105858

INFO:Releasing Order Number JIS7062049

Releasing order : HHS7028972 #Release B4: 0!!! Release Failed !!! * #Release Af: 0

INFO:Releasing Order Number CYS7033152

Releasing order : KOS7094539 #Release B4: 0!!! Release Failed !!! * #Release Af: 0

INFO:Releasing Order Number SOS7090300

Releasing order : JAS7019919 #Release B4: 0!!! Release Failed !!! * #Release Af: 0

INFO:Releasing Order Number NRS7088038

Releasing order : CYS7033133 #Release B4: 0!!! Release Failed !!! * #Release Af: 0

Releasing order : SYS7037963 #Release B4: 0!!! Release Success !!! #Release Af: 1

INFO:Releasing Order Number EAS7183420

Releasing order : ADS7105858 #Release B4: 0!!! Release Failed !!! * #Release Af: 0

INFO:Releasing Order Number FGS7048399

INFO:Releasing Order Number WIS7205124

Releasing order : JIS7062049 #Release B4: 0!!! Release Failed !!! * #Release Af: 0

INFO:Releasing Order Number AMS7182330

Releasing order : CYS7033152 #Release B4: 0!!! Release Failed !!! * #Release Af: 0

Releasing order : SOS7090300 #Release B4: 0!!! Release Failed !!! * #Release Af: 0

INFO:Releasing Order Number NUS7081046

INFO:Releasing Order Number CYS7033162

Releasing order : NRS7088038 #Release B4: 0!!! Release Failed !!! * #Release Af: 0

Releasing order : FGS7048399 #Release B4: 0!!! Release Failed !!! * #Release Af: 0

INFO:Releasing Order Number OAS7122192

Releasing order : WIS7205124 #Release B4: 0!!! Release Failed !!! * #Release Af: 0

Releasing order : EAS7183420 #Release B4: 0!!! Release Failed !!! * #Release Af: 0

Releasing order : AMS7182330 #Release B4: 0!!! Release Failed !!! * #Release Af: 0

Releasing order : NUS7081046 #Release B4: 0!!! Release Failed !!! * #Release Af: 0

Releasing order : CYS7033162 #Release B4: 0!!! Release Failed !!! * #Release Af: 0

Releasing order : OAS7122192 #Release B4: 0!!! Release Failed !!! * #Release Af: 0

#########

ERROR log

WebContainer : 8 DEBUG : *Value of ServiceName configured****:null : DynamicCondition : 2018-03-19 10:43:09,684

WebContainer : 8 TIMER : checkMatch - End - [4] : Condition : 2018-03-19 10:43:09,685

WebContainer : 8 DEBUG : Condition value is: false : ConditionFlowComponent : 2018-03-19 10:43:09,685

WebContainer : 8 DEBUG : processing insert batches : ConnectionHolder : 2018-03-19 10:43:09,685

WebContainer : 8 DEBUG : processing update batches : ConnectionHolder : 2018-03-19 10:43:09,685

WebContainer : 8 DEBUG : processing delete batches : ConnectionHolder : 2018-03-19 10:43:09,685

WebContainer : 8 DEBUG : Not ending transaction because we're part of a larger one : TransactionWrapper : 2018-03-19 10:43:09,685

WebContainer : 8 ERROR : Caught wrapped exception invoking API : ApiHelper : 2018-03-19 10:43:10,101

WebContainer : 8 ERROR : [1521436390101] http://mnop-ips-sit-web.betaish-tx37.com:9004/webapp/ips/ips/component/promotion/services/TestServices: ApiHelper       : 2018-03-19 10:43:10,101

WebContainer : 8 ERRORDTL: [1521436390101]java.io.FileNotFoundException: http://mnop-ips-sit-web.betaish-tx37.com:9004/webapp/ips/ips/component/promotion/services/TestServices at sun.net.www.protocol.http.HttpURLConnection.getInputStream0(HttpURLConnection.java:1851)

at sun.net.www.protocol.http.HttpURLConnection.getInputStream(HttpURLConnection.java:1456)

at com.package.pack.utils.SCipsoapUtils.sendXMLStringInSOAP(SCipsoapUtils.java:695)

at com.package.pack.business.integration.IntegrationService.sendAndReceiveSOAPClient(IntegrationService.java:165)

at sun.reflect.NativeMethodAccessorImpl.invoke0(Native Method)

at sun.reflect.NativeMethodAccessorImpl.invoke(NativeMethodAccessorImpl.java:95)

at sun.reflect.DelegatingMethodAccessorImpl.invoke(DelegatingMethodAccessorImpl.java:55)

at java.lang.reflect.Method.invoke(Method.java:508)

at com.package.services.api.ApiHelper.invoke(ApiHelper.java:223)

at com.package.services.flowcomponents.ApiFlowComponent.execute(ApiFlowComponent.java:210)

at com.package.services.flowcomponents.ApiFlowComponent.send(ApiFlowComponent.java:269)

at com.package.services.flowcomponents.ApiFlowComponent.send(ApiFlowComponent.java:272)

at com.package.services.flowcomponents.ApiFlowComponent.send(ApiFlowComponent.java:272)

at com.package.integration.adapter.FlowExecutor.execute(FlowExecutor.java:395)

at com.package.integration.adapter.SynchronousIntegrationFlow.executeFlow(SynchronousIntegrationFlow.java:277)

at com.package.services.api.ApiRequestDispatcher.executeFlow(ApiRequestDispatcher.java:88)

at sun.reflect.GeneratedMethodAccessor153.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.client.ApiInvokeHandler.callMethod(ApiInvokeHandler.java:65)

at com.package.client.ApiInvokeHandler.invoke(ApiInvokeHandler.java:43)

at com.sun.proxy.$Proxy31.executeFlow(Unknown Source)

at sun.reflect.GeneratedMethodAccessor152.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.client.LocalClientAdapter.invoke(LocalClientAdapter.java:42)

at com.package.client.ClientAPICallHandler.invoke(ClientAPICallHandler.java:77)

at com.sun.proxy.$Proxy31.executeFlow(Unknown Source)

at com.package.pack.business.integration.InvokeIntegrationService.invokeService(InvokeIntegrationService.java:66)

at sun.reflect.GeneratedMethodAccessor183.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.services.api.ApiHelper.invoke(ApiHelper.java:223)

at com.package.services.flowcomponents.ApiFlowComponent.execute(ApiFlowComponent.java:210)

at com.package.services.flowcomponents.ApiFlowComponent.send(ApiFlowComponent.java:269)

at com.package.services.flowcomponents.ApiFlowComponent.send(ApiFlowComponent.java:272)

at com.package.integration.adapter.FlowExecutor.execute(FlowExecutor.java:395)

at com.package.integration.adapter.SynchronousIntegrationFlow.executeFlow(SynchronousIntegrationFlow.java:277)

at com.package.services.api.ApiRequestDispatcher.executeFlow(ApiRequestDispatcher.java:88)

at sun.reflect.GeneratedMethodAccessor153.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.client.ApiInvokeHandler.callMethod(ApiInvokeHandler.java:65)

at com.package.client.ApiInvokeHandler.invoke(ApiInvokeHandler.java:43)

at com.sun.proxy.$Proxy31.executeFlow(Unknown Source)

at sun.reflect.GeneratedMethodAccessor152.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.client.LocalClientAdapter.invoke(LocalClientAdapter.java:42)

at com.package.client.ClientAPICallHandler.invoke(ClientAPICallHandler.java:77)

at com.sun.proxy.$Proxy31.executeFlow(Unknown Source)

at com.package.core.DefaultImpl.invokeFlow(DefaultImpl.java:135)

at com.package.api.Proxy.getInfoRuleDetails(Proxy.java:344)

at com.package.core.TransactionCacheImpl.getInfoRuleDetailsUE(TransactionCacheImpl.java:422)

at com.package.core.TransactionCacheImpl.getInfoRuleEntity(TransactionCacheImpl.java:376)

at com.package.core.TransactionCacheImpl.getInfoRuleDetails(TransactionCacheImpl.java:397)

at com.package.customdb.PromotionImpl.getXML(PromotionImpl.java:262)

at com.package.dbclasses.HeaderBase.getPromotionsXML(HeaderBase.java:11393)

at com.package.dbclasses.HeaderBase.getXML(HeaderBase.java:10692)

at com.package.customdb.HeaderImpl.getXML(HeaderImpl.java:2827)

at com.package.business.order.get.OrderDetail.getOrderDetail(OrderDetail.java:202)

at com.package.bridge.FoundationBridge.getOrderDetails(FoundationBridge.java:2391)

at com.package.business.OrderDetails.processXML(OrderDetails.java:574)

at com.package.business.OrderDetails.process(OrderDetails.java:331)

at com.package.business.OrderDetails.getOrderDetails(OrderDetails.java:181)

at com.package.api.ApiImpl.getOrderDetails(ApiImpl.java:271)

at sun.reflect.GeneratedMethodAccessor151.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.services.api.ApiHelper.invokeLocalApi(ApiHelper.java:805)

at com.package.services.api.ApiHelper.invoke(ApiHelper.java:695)

at com.package.integration.adapter.DefaultIntegrationFlow.invoke(DefaultIntegrationFlow.java:223)

at com.package.integration.adapter.DefaultIntegrationFlow.invoke(DefaultIntegrationFlow.java:97)

at com.api.modutil.XapiRepositoryImpl$1.invoke(XapiRepositoryImpl.java:45)

at com.package.client.XApiRequestDispatcher.invoke(XApiRequestDispatcher.java:83)

at com.package.integration.adapter.IntegrationFlowAdapter.invoke(IntegrationFlowAdapter.java:25)

at com.package.services.api.ApiRequestDispatcher.invoke(ApiRequestDispatcher.java:79)

at sun.reflect.GeneratedMethodAccessor100.invoke(Unknown Source)

at sun.reflect.DelegatingMethodAccessorImpl.invoke(DelegatingMethodAccessorImpl.java:55)

at java.lang.reflect.Method.invoke(Method.java:508)

at com.package.client.ApiInvokeHandler.callMethod(ApiInvokeHandler.java:65)

at com.package.client.ApiInvokeHandler.invoke(ApiInvokeHandler.java:43)

at sun.reflect.DelegatingMethodAccessorImpl.invoke(DelegatingMethodAccessorImpl.java:55)

at java.lang.reflect.Method.invoke(Method.java:508)
#########

VERBOSE log

Thread-22_MONITOR DEBUG : Creating a local client : FactoryImpl : 2020-06-23 15:02:56,558

Thread-22_MONITOR DEBUG : Creating a local client : FactoryImpl : 2020-06-23 15:02:56,559

Thread-22_MONITOR DEBUG : Joined existing transaction : TransactionWrapper : 2020-06-23 15:02:56,559

Thread-22_MONITOR DEBUG : Executing invoke : ApiHelper : 2020-06-23 15:02:56,559

Thread-22_MONITOR DEBUG : context tracing level found to be as:null : ApiHelper : 2020-06-23 15:02:56,559

Thread-22_MONITOR DEBUG : Resolved API Name is: getCommonCodeList : ApiSignatureResolver : 2020-06-23 15:02:56,559

Thread-22_MONITOR DEBUG : Trying to resolve invocationto a pure document api : ApiSignatureResolver : 2020-06-23 15:02:56,559

Thread-22_MONITOR DEBUG : Found the api and resolved signature : ApiSignatureResolver : 2020-06-23 15:02:56,559

Thread-22_MONITOR DEBUG : Setting maximum records to 5000 in the input document of getCommonCodeList api: ApiHelper : 2020-06-23 15:02:56,559

Thread-22_MONITOR DEBUG : Invoking api Method: getCommonCodeList : ApiHelper : 2020-06-23 15:02:56,559

Thread-22_MONITOR DEBUG : app context key ChangeProjectKey not present in app context info map : AppContextInfoUtil : 2020-06-23 15:02:56,559

Thread-22_MONITOR DEBUG : processing app context info : AppContextInfoUtil : 2020-06-23 15:02:56,559

Thread-22_MONITOR DEBUG : appContextInfoElem is null & userId is not null : AppContextInfoUtil : 2020-06-23 15:02:56,560

Thread-22_MONITOR DEBUG : invoking APP_CONTEXT_INFO_EP extension point : AppContextInfoUtil : 2020-06-23 15:02:56,560

Thread-22_MONITOR VERBOSE: API input : <?xml version="1.0" encoding="UTF-8"?>

```
<CommonCode CodeType="INV_SELLERS" MaximumRecords="5000" OrganizationCode="DEFAULT"/>
```

: ApiHelper          : 2020-06-23 15:02:56,560

Thread-22_MONITOR TIMER  : verifyAndEnableConfigDataDump - Begin          :
Context         : 2020-06-23 15:02:56,560

Thread-22_MONITOR DEBUG  : configuration dump mode:NONE          : Context
: 2020-06-23 15:02:56,560

Thread-22_MONITOR TIMER  : verifyAndEnableConfigDataDump - End - [0]          :
Context         : 2020-06-23 15:02:56,560

Thread-22_MONITOR DEBUG  : Trying to obtain the template based on resourceId          :
TemplateManager     : 2020-06-23 15:02:56,560

Thread-22_MONITOR DEBUG  : Trying to obtain the template from default template folders...:
TemplateManager     : 2020-06-23 15:02:56,560

Thread-22_MONITOR DEBUG  : getTemplateForBaseName....enterpriseCode in bufParams: null
: TemplateManager     : 2020-06-23 15:02:56,560

Thread-22_MONITOR VERBOSE: inDoc is <?xml version="1.0" encoding="UTF-8"?>

```
<DetermineOrgHierarchy CallingOrganizationCode="" TableName="USER_IMPL"/>
```

: ConfigurationManager  : 2020-06-23 15:02:56,560

Thread-22_MONITOR VERBOSE: BaseConfigGrpDefn: level=Enterprise; overrideMode=02; inheritable=Y; groupName1=ExtendedProcessModel; extnMode=false; orgColumn=null; nodeColumn=null: ConfigurationManager  : 2020-06-23 15:02:56,560

Thread-22_MONITOR VERBOSE: Processing for Enterprise Level - New          :
ConfigurationManager  : 2020-06-23 15:02:56,560

Thread-22_MONITOR DEBUG  : orgCode is void          :
ConfigurationManager  : 2020-06-23 15:02:56,560

Thread-22_MONITOR VERBOSE: Looking for (1):
/global/template/api/getCommonCodeList.xml: TemplateManager     : 2020-06-23 15:02:56,560

Thread-22_MONITOR VERBOSE: Looking for (2):
/global/template/api/extn/getCommonCodeList.xml: TemplateManager     : 2020-06-23 15:02:56,560

Thread-22_MONITOR VERBOSE: Looking for (3):
/global/template/api/getCommonCodeList.xml : TemplateManager     : 2020-06-23 15:02:56,560

Thread-22_MONITOR VERBOSE: Looking for (3): /getCommonCodeList.xml : TemplateManager : 2020-06-23 15:02:56,560

Thread-22_MONITOR VERBOSE: Looking for (1): /global/template/api/getCommonCodeList.xml : TemplateManager : 2020-06-23 15:02:56,560

Thread-22_MONITOR VERBOSE: Looking for (2): /template/api/extn/getCommonCodeList.xml : TemplateManager : 2020-06-23 15:02:56,560

Thread-22_MONITOR VERBOSE: Looking for (3): /template/api/getCommonCodeList.xml : TemplateManager : 2020-06-23 15:02:56,560

Thread-22_MONITOR DEBUG : TemplateManager.getAPITemplategetCommonCodeList : TemplateManager : 2020-06-23 15:02:56,560

Thread-22_MONITOR VERBOSE: TemplateManager.getAPITemplate<?xml version="1.0" encoding="UTF-8"?>

<CommonCodeList>

<CommonCode CodeLength=" " CodeLongDescription=" " CodeName=" "

CodeShortDescription=" " CodeSymbol=" " CodeType=" "

CodeValue=" " CommonCodeKey=" " DocumentType=" "

MeantForEnterprise=" " MeantForInternal=" " MeantForSupplier=" "

OrganizationCode=" " QualifiedTagId=" " SystemDefinedCode=" ">

<LocalizedAttributes/>

</CommonCode>

</CommonCodeList>

: TemplateManager : 2020-06-23 15:02:56,561

Thread-22_MONITOR DEBUG : TemplateManager.getCommonCodeList entityApi: listCommonCode: TemplateManager : 2020-06-23 15:02:56,561

Thread-22_MONITOR VERBOSE: TemplateManager.appendTemplate<?xml version="1.0" encoding="UTF-8"?>

<CommonCodeList>

<CommonCode CodeLength=" " CodeLongDescription=" " CodeName=" "

CodeShortDescription=" " CodeSymbol=" " CodeType=" "

CodeValue=" " CommonCodeKey=" " DocumentType=" "

MeantForEnterprise=" " MeantForInternal=" " MeantForSupplier=" "

OrganizationCode=" " QualifiedTagId=" " SystemDefinedCode=" ">

<LocalizedAttributes/>

</CommonCode>

</CommonCodeList>

: TemplateManager    : 2020-06-23 15:02:56,561

Thread-22_MONITOR VERBOSE: ------------------------ selectWithWhere: Processing: Prepared Statement - WHERE CODE_TYPE = 'INV_SELLERS' : Common_CodeDBCacheHome: 2020-06-23 15:02:56,561

Thread-22_MONITOR VERBOSE: ------------------------ selectWithWhere: Processing: Prepared Statement - WHERE (BASE_CONFIG_GRP_DEFN.BASE_CONFIG_GRP_DEFN_KEY = 'CustomCommonCode'): Base_Config_Grp_DefnDBCacheHome: 2020-06-23 15:02:56,561

Thread-22_MONITOR TIMER  : invoke - Begin                               : Api       : 2020-06-23 15:02:56,561

Thread-22_MONITOR VERBOSE: Parameters::listCommonCode:<?xml version="1.0" encoding="UTF-8"?>

<CommonCode CodeType="INV_SELLERS" MaximumRecords="5000" OrganizationCode="DEFAULT"/>

:null: Api       : 2020-06-23 15:02:56,561

Thread-22_MONITOR TIMER  : listCommonCode - Begin                        : Api       : 2020-06-23 15:02:56,561

Thread-22_MONITOR TIMER  : getEntityApi - Begin                          : Api       : 2020-06-23 15:02:56,561

Thread-22_MONITOR VERBOSE: Parameters:CommonCode                         : Api       : 2020-06-23 15:02:56,561

Thread-22_MONITOR TIMER  : getEntityApi - End - [0]                      : Api       : 2020-06-23 15:02:56,561

What is claimed is:

1. A computer system implemented method of dynamic logging including:
   generating parsed event data by at least one natural language (NL) processor responsive to event data of a log for transactions of a target application;
   classifying, by a first classifier applying a first machine learning model to the parsed event data, context states of the respective transactions of the target application;
   classifying, by a second classifier applying a second machine learning model to the parsed event data and the context states, trouble prone states of the respective transactions, wherein the trouble prone states are for respective hierarchical levels;
   determining, by a logic module, for a current one of the trouble prone states for a current transaction, that the current trouble prone state is a higher trouble prone level than for a transaction immediately preceding the current transaction; and
   sending, by the logic module to the target application, an increased log detail selection responsive to the determining that the current trouble prone state is the higher trouble prone level, so that a greater amount of log detail is logged for at least a next transaction after the current transaction.

2. The method of claim 1, wherein the context states of respective transactions of the target application include a security context.

3. The method of claim 1, wherein the context states of respective transactions of the target application include a technical context.

4. The method of claim 1, wherein the context states of respective transactions of the target application include a functional context.

5. The method of claim 1, wherein the hierarchical levels include at least a lowest level, a highest level and a level between the lowest and highest levels.

6. The method of claim 1, comprising:
   determining, by the logic module, for a current one of the trouble prone states for a current transaction, that the current trouble prone state is a lower trouble prone level than for a transaction immediately preceding the current transaction; and
   sending, by the dynamic logging level logic to the target application, a decreased log detail selection responsive to the determining that the current trouble prone state is the lower trouble prone level, so that a decreased amount of log detail is logged for at least a next transaction after the current transaction.

7. The method of claim 1, comprising:
   generating the parsed event data by the at least one NL processor includes generating the parsed event data by a NL processor of the logic module.

8. The method of claim 1, wherein the first and second machine learning models include respective clustering models.

9. A computer system for dynamic logging, the system comprising:
   a processor; and
   a computer readable storage medium connected to the processor, wherein the computer readable storage medium has stored thereon a program for controlling the processor, and wherein the processor is operative with the program to execute the program for:
   generating parsed event data by at least one natural language (NL) processor responsive to event data of a log for transactions of a target application;
   classifying, by a first classifier applying a first machine learning model to the parsed event data, context states of the respective transactions of the target application;
   classifying, by a second classifier applying a second machine learning model to the parsed event data and the context states, trouble prone states of the respective transactions, wherein the trouble prone states are for respective hierarchical levels;
   determining, by a logic module, for a current one of the trouble prone states for a current transaction, that the current trouble prone state is a higher trouble prone level than for a transaction immediately preceding the current transaction; and
   sending, by the logic module to the target application, an increased log detail selection responsive to the determining that the current trouble prone state is the higher trouble prone level, so that a greater amount of log detail is logged for at least a next transaction after the current transaction.

10. The computer system of claim 9, wherein the context states of respective transactions of the target application include a security context, a technical context and a functional context.

11. The computer system of claim 9, wherein the hierarchical levels include at least a lowest level, a highest level and a level between the lowest and highest levels.

12. The computer system of claim 9, wherein the processor is operative with the program to execute the program for:
    determining, by the logic module, for a current one of the trouble prone states for a current transaction, that the current trouble prone state is a lower trouble prone level than for a transaction immediately preceding the current transaction; and
    sending, by the dynamic logging level logic to the target application, a decreased log detail selection responsive to the determining that the current trouble prone state is the lower trouble prone level, so that a decreased amount of log detail is logged for at least a next transaction after the current transaction.

13. The computer system of claim 9, wherein generating the parsed event data by the at least one NL processor includes generating the parsed event data by a NL processor of the logic module.

14. The computer system of claim 9, wherein the first and second machine learning models include respective clustering models.

15. A computer program product for dynamic logging, the computer program product comprising a computer readable storage medium having program instructions embodied therewith, the program instructions executable by a processor to cause the processor to:
    generate parsed event data by at least one natural language (NL) processor responsive to event data of a log for transactions of a target application;
    classify, by a first classifier applying a first machine learning model to the parsed event data, context states of the respective transactions of the target application;
    classify, by a second classifier applying a second machine learning model to the parsed event data and the context states, trouble prone states of the respective transactions, wherein the trouble prone states are for respective hierarchical levels;
    determine, by a logic module, for a current one of the trouble prone states for a current transaction, that the current trouble prone state is a higher trouble prone level than for a transaction immediately preceding the current transaction; and send, by the logic module to the target application, an increased log detail selection responsive to the determining that the current trouble prone state is the higher trouble prone level, so that a greater amount of log detail is logged for at least a next transaction after the current transaction.

16. The computer program product of claim 15, wherein the context states of respective transactions of the target application include a security context, a technical context and a functional context.

17. The computer program product of claim 15, wherein the hierarchical levels include at least a lowest level, a highest level and a level between the lowest and highest levels.

18. The computer program product of claim 15, wherein the program instructions are executable by a processor to cause the processor to:

determine, by the logic module, for a current one of the trouble prone states for a current transaction, that the current trouble prone state is a lower trouble prone level than for a transaction immediately preceding the current transaction; and send, by the dynamic logging level logic to the target application, a decreased log detail selection responsive to the determining that the current trouble prone state is the lower trouble prone level, so that a decreased amount of log detail is logged for at least a next transaction after the current transaction.

19. The computer program product of claim 15, wherein generating the parsed event data by the at least one NL processor includes generating the parsed event data by a NL processor of the logic module.

20. The computer program product of claim 15, wherein the first and second machine learning models include respective clustering models.

* * * * *